United States Patent [19]
Phillips

[11] Patent Number: 5,642,449
[45] Date of Patent: Jun. 24, 1997

[54] FIBRE OPTIC PLATE DISPLAY

[75] Inventor: Nicholas John Phillips, Loughborough, United Kingdom

[73] Assignees: Nashua Corporation, Nashua, N.H.; Nashua Photo Limited, Devon, England

[21] Appl. No.: 320,159

[22] Filed: Oct. 7, 1994

[30] Foreign Application Priority Data

Oct. 8, 1993 [GB] United Kingdom ................ 9320743

[51] Int. Cl.⁶ .................................................. G02B 6/36
[52] U.S. Cl. ........................................... 385/33; 385/120
[58] Field of Search ......................... 385/31, 33, 117, 385/118, 119, 120; 359/741, 619, 652

[56] References Cited

U.S. PATENT DOCUMENTS

| | | | |
|---|---|---|---|
| 3,303,374 | 2/1967 | Fyler | 385/120 X |
| 3,360,450 | 12/1967 | Hays | 385/120 |
| 3,622,419 | 11/1971 | London | 385/120 X |
| 3,628,080 | 12/1971 | Lindeqvist | 385/120 |
| 3,774,173 | 11/1973 | Love et al. | 385/120 X |
| 3,878,329 | 4/1975 | Brown | 385/120 |
| 3,907,403 | 9/1975 | Maeda | 385/120 |
| 4,141,641 | 2/1979 | Nagai et al. | 385/120 X |
| 4,591,232 | 5/1986 | Jeskey | 385/120 |
| 4,904,049 | 2/1990 | Hegg | 385/120 |
| 5,074,649 | 12/1991 | Hamanaka | 359/652 |
| 5,130,852 | 7/1992 | Hamanaka | 359/741 |
| 5,299,275 | 3/1994 | Jackson et al. | 385/120 X |
| 5,311,611 | 5/1994 | Migliaccio | 385/120 |

FOREIGN PATENT DOCUMENTS

| | | |
|---|---|---|
| 2206979 | 1/1989 | United Kingdom. |
| 009952 | 12/1988 | WIPO. |

*Primary Examiner*—Akm E. Ullah
*Attorney, Agent, or Firm*—Webb Ziesenheim Bruening Logsdon Orkin & Hanson, P.C.

[57] ABSTRACT

An image display arrangement comprising a collimating fibre-optic plate arranged to be illuminated from one side, for example a fibre optic plate forming the screen of a c.r.t. display tube and coated with a phosphor for providing such light, has, on at least one side thereof a layer of a photopolymer having formed therein an array of integral graded refractive index lenses, each extending over and in register with the end face, adjoining the photopolymer layer, of a respective optic fibre of the fibre optic plate. Each said graded refractive index lens is of a power such as to enhance the collimating effect of the respective optic fibre. A diffusion layer is preferably superimposed on the photopolymer layer, to impart a controlled diffusion to light passing through the optical fibres and said photopolymer layer, such as to render invisible or less visible the regions, in the fibre-optic plate, between adjoining optical fibres. The invention thus reduces or eliminates the so-called "chicken wire" effect.

6 Claims, 1 Drawing Sheet

PRIOR ART

FIBRE OPTIC PLATE DISPLAY

FIELD OF THE INVENTION

This invention relates to a display device incorporating a fibre optic plate.

BACKGROUND OF THE INVENTION

Cathode ray display tube devices are, of course, well known for the production of images. In certain specialist applications, it is desirable that the light from such a cathode ray tube display device should be collimated, that is to say it should be concentrated along a principal axis of the display device with little or no light from the C.R.T. being lost to the sides, at angles to said axis. One way of achieving this effect is to form the front of the cathode ray tube, i.e. the portion providing the screen, as a so-called fibre optic plate in place of the more conventional substantially homogeneous plate of thick glass. Such a fibre optic plate usually comprises a light-transmitting planar plate which behaves as if it comprised a large number of optical fibres, (for example glass fibres), arranged as a "bundle" in which the fibres run generally parallel with each other and generally perpendicular to the major faces of the plate, each end of each fibre terminating in a respective face of the plate with the interstices between the fibres being filled with an opaque medium. Thus, the individual optical fibres form "light pipes" oriented for the conduction of light from one face of the plate to the other generally at right angles to the plane of the plate. Such a fibre optic plate may be formed by forming initially a cylindrical rod of transparent glass surrounded circumferentially by a layer of opaque, black glass fused to the transparent glass, the glass being at a temperature at which it is plastic and drawable, "pulling" the composite rod of glass whilst it is still in this plastic state to increase its length and reduce its diameter, dividing the pulled rod into a plurality of lengths which are placed together in a bundle and drawn again so that the individual lengths fuse together affording an integral body of glass comprising several transparent approximately cylindrical regions extending through an opaque black matrix, dividing the last-noted body again into several lengths which are again placed together and pulled once again, the resultant being cut into lengths, bundled together and pulled again and so on, the number of transparent cylindrical regions being multiplied at each stage and the diameters of said regions being reduced at each stage until the required pitch and diameter of such transparent cylindrical regions are reached. The average diameter of each transparent region or "fibre" at this stage may be around $5\mu$ ($5\times10^{-6}$ metre) with concomitant spacing between "fibres". The resulting unitary "log" of fused glass is then allowed to cool at an appropriate rate before being cut into individual slices perpendicularly to the direction in which said transparent regions or "fibres" extend, each such slice forming a respective fibre optic plate. The opposite major faces of each such plate are then polished to optical standard. To incorporate such a fibre optic plate as the front wall of a cathode ray tube, the edges of such a ground and polished slice are cut to the appropriate size and shape to fit a pre-formed shell affording the rear part of the cathode ray tube and the fibre optic plate fused in place or cemented in place using an appropriate resin, the rear face of the fibre optic plate being coated with a phosphor layer before or after such fusing or cementing of the fibre optic plate to the remainder of the tube and with remaining manufacturing stages including evacuation and sealing of the tube, proceeding in the conventional fashion.

It would also be possible to produce a "fibre optic plate" within the meaning of the term as used herein by forming a "log" or bundle of optical fibres of relatively great length, the fibre bundle being impregnated with a selected opaque, preferably black, cement and the bundle being compressed transversely to the longitudinal direction of the bundle prior to curing of the cement to ensure that the individual optical fibres are packed closely together. Fibre optic face plates may then be formed by sawing thin slices from the "log" thus formed and polishing the opposite faces of each plate to optical quality. Conceivably, a similar product could be made using, for example, transparent plastics fibres cemented together by opaque resin.

The collimating effect of such a fibre optic plate is illustrated schematically in FIG. 2 which shows to an enlarged scale and in section, at 20, such a fibre optic plate, the phosphor layer being indicated at 22. Light from the phosphor layer 22, caused by electrons striking the latter, enters the rear face of each optical fibre at various angles, with light rays which enter parallel with the axis of an optical "fibre" 24, (i.e. a transparent region) and thus perpendicular to the major faces of the fibre optic plate, passing straight through the plate, whilst light rays entering more than a very slight angle pass through the sides of the "fibres" and are absorbed by the opaque glass (indicated at 28 in FIG. 2). Accordingly, because of selective transmission of light rays which are directed approximately parallel with the longitudinal axis of the fibres, the light emerging from each fibre 24 is confined to a relatively narrow solid angle centred on the fibre axis, thereby affording an approximation to the desired collimation of the light from the C.R.T. screen. A disadvantage presented by such an arrangement, however, particularly when the C.R.T. image is subjected to magnification, is that the opaque glass between adjoining "fibres" is visible when the screen is viewed normal to the plane of the fibre optic plate, as illustrated diagrammatically in FIG. 3, presenting a so-called "chicken-wire" effect.

SUMMARY OF THE INVENTION

It is an object of the present invention to provide an improved means of removing or reducing the visibility of the opaque regions in a fibre optic plate, between the light-transmitting "fibres" when viewed normal to the plane of the plate and thus to reduce or remove the "chicken-wire" effect.

According to one aspect of the invention this is achieved by providing, on the exit side of the fibre optic plate, a diffusing layer, preferably a layer of photopolymer in which is- formed an array of graded refractive index lenses, the diameters of said graded refractive index lenses in said diffusion layers being substantially less than the diameters of the optical fibres.

According to another aspect of the invention, there is provided an image display arrangement comprising a collimating fibre-optic plate arranged to be illuminated from one side, and having, on at least one side thereof a layer of a photopolymer having formed therein an array of integral graded refractive index lenses, each extending over and in register with the end face, adjoining the photopolymer layer, of a respective optic fibre of said fibre optic plate, each said graded refractive index lens being of a power such as to enhance the collimating effect of the respective optic fibre.

According to another aspect of the invention, there is provided a method of making a display arrangement comprising providing a cathode ray tube display device having a front afforded by a fibre optic plate, with the inner, rear face of the fibre optic plate being coated with the tube phosphor, applying to the front face of the fibre optic plate a layer of photopolymerisable resin and causing the resin to polymerise selectively, to form collimating graded refractive index lenses, by operating the cathode ray tube, including scanning said phosphor layer by an electron beam, thereby selectively exposing, through each optical fibre of the fibre optic plate, a registering region of said photopolymerisable resin to form the respective graded refractive index collimating lens and subsequently applying to the surface of the collimating photopolymer layer a pre-formed light diffusing layer.

An embodiment of the invention is described below with reference to the accompanying drawings.

DESCRIPTION OF PREFERRED EMBODIMENT

Figure 1:
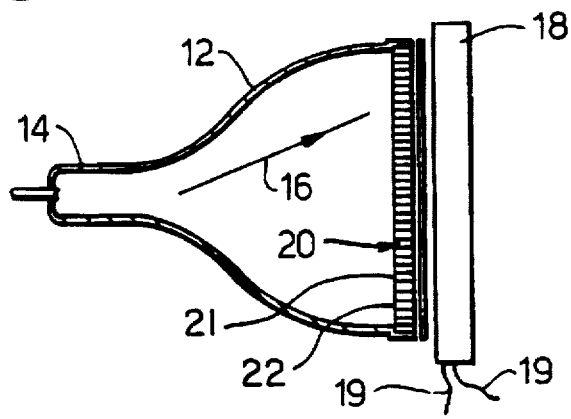
FIG. 1 is a diagrammatic sectional view illustrating a C.R.T. display tube with a fibre optic screen forming part of an image display arrangement in accordance with the invention.

Referring to FIG. 1, a cathode ray tube display device comprises a cathode ray tube which is of conventional form, having a front wall or screen part 21 which together with a rear part 12 forms, in conventional manner, an evacuated vessel in a neck 14 of which is mounted an electron gun assembly (not shown) whereby a beam of electrons 16 may be directed towards the inner rear surface of the front wall 21, to strike a phosphor layer 22 adhered to the inner or rear face of the wall 21. Electrical means for scanning the beam 16 in a scanning raster across the phosphor layer is of course provided, but such means is not shown, for such means is, of course, well known to those skilled in the art. The front wall 21 of the cathode ray tube takes the form of a fibre optic plate 20 of the type already described. The nature of the fibre optic plate and the operation thereof has been described above and such description will not therefore be repeated here.

In one arrangement utilising the invention, the collimated light from the fibre optic plate 20 passes to a light valve 18, known per se, allowing such light to be controlled or modulated, as desired, by electrical signals applied thereto by means illustrated schematically in FIG. 1 as leads 19.

Figure 2:
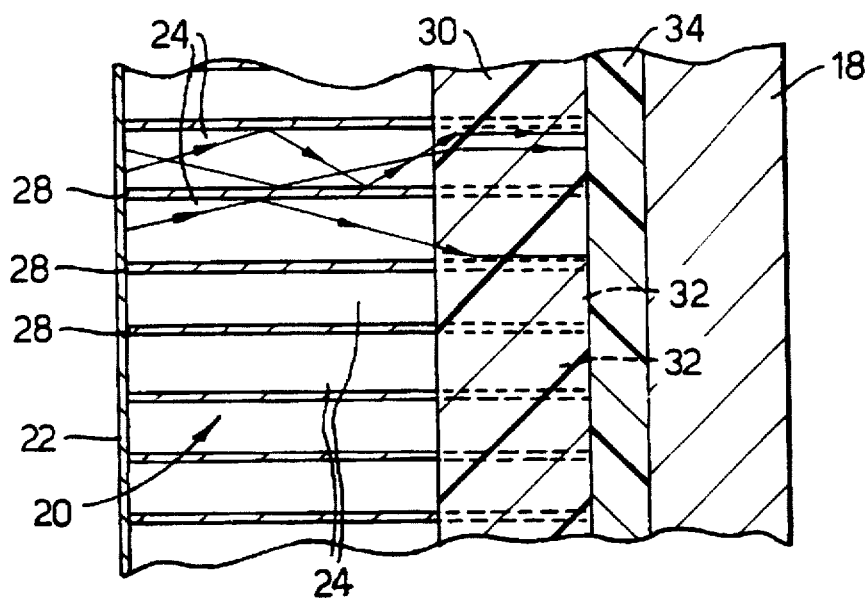
FIG. 2 is a schematic longitudinal sectional view, corresponding to FIG. 1 but to an enlarged scale showing the screen region only of the display arrangement
Figure 3:
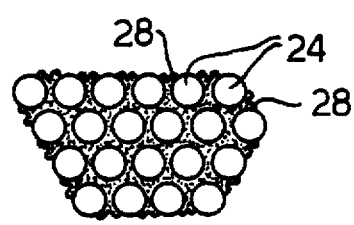
FIG. 3 is a diagrammatic front view of a portion of the end face of a known fibre optic plate.

Referring to FIG. 2 there is applied to the front face of the fibre optic plate 20 a layer 30 of a photopolymer in which has been formed, by selective polymerisation, an array of graded refractive index 32-GRIN lenses), illustrated in FIG. 2 as being bounded by broken lines, each graded refractive index lens being in register with a respective optical fibre 24 and having its optical axis coincident with the longitudinal axis of the respective optical fibre 24. Each graded refractive index lens 32 is characterised by a reduction in refractive index with radial distance from its optical axis, the refractive index gradient corresponding with a variation in degree of polymerisation of the material. The nature and operation of such graded refractive index lenses is described in greater detail in European Patent No. 0294122 to which reference should be had. As indicated above, in the absence of the photopolymer layer 30, each optical fibre 24 effectively confines the light passing therethrough to a relatively narrow solid angle centred on the fibre axis and having its apex located within the fibre. Thus to a first approximation, at least, the light from each fibre effectively appears to radiate from a "focal point" within the fibre. The function of each graded refractive index lens 32 is then to collimate each such diverging beam of light into a parallel beam of light. Thus, ideally, and in the absence of the diffusing layer 34 referred to below, light will emerge from each graded refractive index lens 32 at its end face remote from the fibre optic plate 20 as a respective parallel beam, parallel with the axis of the respective optical fibre 24 and graded refractive index lens 32.

The layer 30 does not, in itself, diminish the "chicken wire" effect referred to above but it does allow very efficient collimation to be achieved and thus, in terms of the image produced, excellent contrast. This, in effect, compensates for the slight degradation in contrast and image definition which will be produced by the layer 34, which does serve to remove or render less noticeable the "chicken wire" effect. The layer 34 is a light-transmitting diffusing screen, preferably a sheet of photopolymer which has been formed by the techniques disclosed in European Patent No. 0294122 or International (WO) Published Specifications Nos. WO91/18304 and WO92/1605, with an array of graded refractive index lenses, of substantially the same character as the lenses 32 and likewise extending with their optical axes perpendicular to the planes of the layers 30 and 34. The graded refractive index lenses in the layer 34 differ, however, from those in the layer 30 by being substantially greater in number and smaller in diameter than those in the layer 30, so that there are a great many graded refractive index lenses of the layer 34, for example tens or hundreds, extending over the end of each graded refractive index lens 32. The layer 34, with its GRIN lenses, is formed separately from the layer 30, by any of the techniques disclosed in European Patent No. 0294122 or International (WO) Published Specifications Nos. WO91/18304 and WO92/1605 and the resulting microlens sheet is then adhered to the finished layer 30 by a suitable adhesive or bonding agent. The diffusion layer 34 is arranged to diffuse the light emerging from the layer 30 sufficiently to just merge the light from adjoining edges of adjoining optical fibres 24, thereby eliminating or substantially reducing the "chicken wire" effect.

In order to ensure exact registration between the optical fibres 24 and graded refractive index lenses 32, the lenses 32 are formed in situ, as follows. The front surface of the fibre optic plate 20 of the completed C.R.T. tube is spin coated with the monomeric precursor of the photopolymer, which is subsequently selectively polymerised using light from the C.R.T. itself, by scanning the phosphor layer 22 by an electron beam in the normal way thereby producing, by virtue of the fibre optic plate 20, variations in illumination of the layer 30, and leading to corresponding variations in degree of polymerisation and consequent variations in refractive index. Since the photopolymer used normally requires ultra violet light for photopolymerisation, unless there is sufficient stray ultra violet light from the phosphor 22, it may be necessary to incorporate, in the photopolymer 30, an activating agent or dye responsive to light of a wavelength available from the C.R.T. and subsequently to bleach out the activating agent.

Whilst the invention has been described in relation to a display device in the form of a cathode ray tube with a fibre optic face plate, it will be appreciated that the invention could also be applied to some other form of imaging device incorporating a fibre optic plate, such as an LCD display arranged adjacent one face of a fibre optic plate and illuminated by light directed towards the LCD display from the side of the LCD display opposite the fibre optic plate.

I claim:

1. An image display arrangement including a cathode ray display unit having a collimating fibre optic plate as the front of the tube, a rear face of the fibre optic plate within the cathode ray tube being coated with a phosphor, an opposite, front face of the fibre optic plate bearing a layer of a photopolymer having formed therein an array of integral GRIN refractive index lenses each extending over and in register with the end face adjoining the photopolymer layer of a respective optic fibre of said fibre optic plate, each said GRIN refractive index lens being of a power such as to enhance the collimating effect of the respective optic fibre.

2. An image display arrangement according to claim 1 wherein a diffusion layer is superimposed on said photopolymer layer, to impart a controlled diffusion to light passing through the optical fibres and said photopolymer layer, such as to render invisible or less visible the regions in the fibre-optic plate between adjoining optical fibres.

3. An image display arrangement according to claim 2 wherein said diffusion layer itself constitutes a layer of photopolymer in which is formed an array of GRIN refractive index lenses, the diameters of said GRIN refractive index lenses in said diffusion layers being substantially less than the diameters of the GRIN refractive index lenses in the collimating layer.

4. An image display arrangement comprising a collimating fibre-optic plate arranged to be illuminated from one side, and having, on at least one side thereof a layer of a photopolymer having formed therein an array of integral GRIN refractive index lenses, each extending over and in register with the end face adjoining the photopolymer layer of a respective optic fibre of said fibre optic plate, each said GRIN refractive index lens being of a power such as to enhance the collimating effect of the respective optic fibre and wherein a diffusion layer is superimposed on said photopolymer layer to impart a controlled diffusion to light passing through the optical fibres and said photopolymer layer, such as to render invisible or less visible the regions in the fibre-optic plate between adjoining optical fibres.

5. A method of making a display arrangement comprising providing a cathode ray tube display device having a front afforded by a fibre optic plate, with the inner, rear face of the fibre optic plate being coated with the tube phosphor, the method including the steps of applying to the front face of the fibre optic plate a layer of photopolymerisable resin and causing the resin to polymerise selectively, to form collimating graded refractive index lenses, by operating the cathode ray tube, including scanning said phosphor layer by an electron beam, thereby selectively exposing, through each optical fibre of the fibre optic plate, a registering region of said photopolymerisable resin, to form the respective graded refractive index collimating lens.

6. A method according to claim 5 including subsequently applying to the surface of the collimating photopolymer layer a pre-formed light diffusing layer.

* * * * *

UNITED STATES PATENT AND TRADEMARK OFFICE
CERTIFICATE OF CORRECTION

PATENT NO. : 5,642,449
DATED : June 24, 1997
INVENTOR(S) : Nicholas John Phillips It is certified that error appears in the above-indentified patent and that said Letters Patent is hereby corrected as shown below:

Column 2 Line 50 after "is" delete --hyphen (-)--.

Column 3 Line 56 "index 32-GRIN lenses" should read --index lenses 32 (GRIN lenses)--.

Signed and Sealed this

Sixteenth Day of September, 1997

Attest:

BRUCE LEHMAN

Attesting Officer

Commissioner of Patents and Trademarks